United States Patent [19]

Lang

[11] Patent Number: 4,784,041
[45] Date of Patent: Nov. 15, 1988

[54] SERVOSTEERING PRESSURE CONTROL DEVICE

[75] Inventor: Armin Lang, Schwabisch Gmund, Fed. Rep. of Germany

[73] Assignee: Zahnradfabrik Friedrichshafen, AG., Friedrichshafen, Fed. Rep. of Germany

[21] Appl. No.: 894,273

[22] Filed: Aug. 5, 1986

[30] Foreign Application Priority Data

Aug. 9, 1985 [WO] PCT Int'l Appl. ............... PCT/EP85/00406

[51] Int. Cl.⁴ ............................................. F15B 9/10
[52] U.S. Cl. ...................................... 91/371; 91/372; 180/143
[58] Field of Search .............. 91/364, 370, 371, 372, 91/452, 468; 137/625.69; 180/141, 143

[56] References Cited

U.S. PATENT DOCUMENTS

| 3,690,400 | 9/1972 | Uchiyama et al. | 180/142 |
|---|---|---|---|
| 3,922,953 | 12/1975 | Strauff | 91/371 |
| 4,344,284 | 2/1982 | Lang | 180/132 X |
| 4,385,493 | 5/1983 | Lang | 91/461 X |
| 4,390,158 | 6/1983 | Lang | 251/129 |
| 4,438,827 | 3/1984 | Lang | 91/371 X |
| 4,462,478 | 7/1984 | Lang | 180/143 |
| 4,463,820 | 8/1984 | Hachisuka et al. | 180/143 |
| 4,531,602 | 7/1985 | Roehringer | 180/143 |
| 4,557,344 | 12/1985 | Lang | 180/143 |
| 4,601,358 | 7/1986 | Kozuka et al. | 91/372 X |
| 4,633,762 | 1/1987 | Tardy | 91/371 X |

FOREIGN PATENT DOCUMENTS 2518337 4/1976 Fed. Rep. of Germany ...... 180/141

Primary Examiner—Robert E. Garrett
Assistant Examiner—Mark A. Williamson
Attorney, Agent, or Firm—Zalkind & Shuster

[57] ABSTRACT

A steering control piston valve has reaction chambers and respective fixed restrictor orifices having an interconnector conduit. The reaction chambers have respective inlet and outlet flow control valving which serve to permit flow from either reaction chamber to bypass the respective restrictor orifice during a steering maneuver if the steered wheels receive a road jolt. The arrangement provides for very rapid flow from the reaction chamber being decreased in volume due to the jolt force on the valve piston causing it to move oppositely to the steering direction. The flow from such reaction chamber passes to the interconnecting conduit for storage. An additional storage tank can be connected to the interconnecting conduit to increase the storage capacity if necessary. The bypassing is likewise advantageous in the event a vehicle swerves and rapid steering correction is necessary.

12 Claims, 2 Drawing Sheets

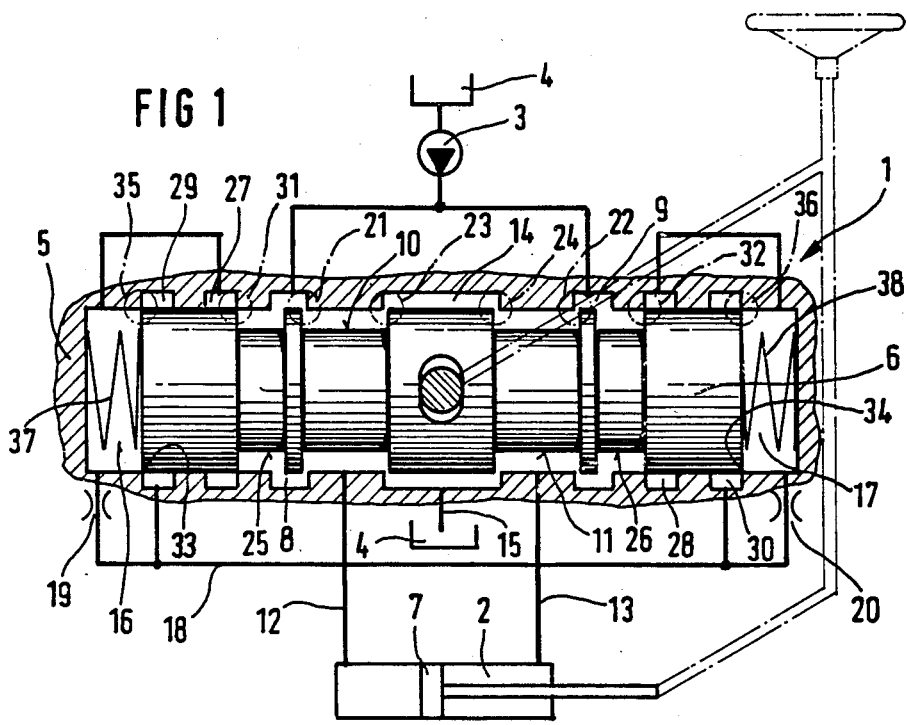
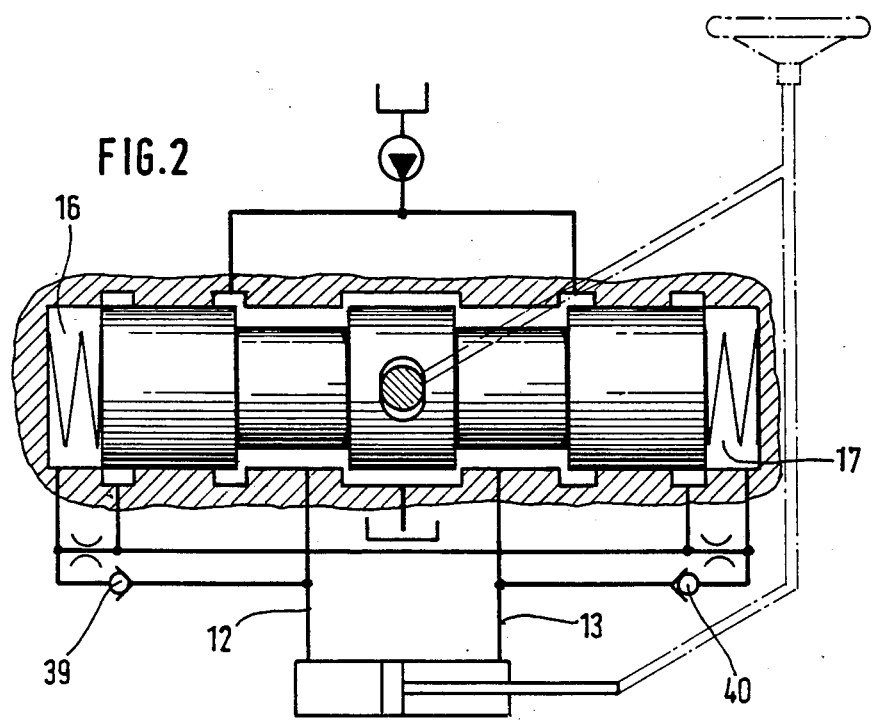

SERVOSTEERING PRESSURE CONTROL DEVICE

The invention is concerned with a servosteering pressure control device for auxiliary power steering mechanisms, and especially for motor vehicles.

BACKGROUND OF THE INVENTION

A steering mechanism known from the German No. OS No. 31 22 370; U.S. Pat. No. 4,438,827 to Armin Lang shows each reaction chamber having associated restrictor orifice in the outlet chamber feeding via variable speed responsible restrictor to a tank. In such a steering mechanism, the hydraulic reaction acting on the steering control valve piston is used to create a simulated steering reaction and also for stabilizing the steering control valve piston as well as for obtaining a delicately sensitive steering adjustment.

A disadvantage of such steering mechaism is the fact that in critical cases in normal driving the usual system pressure may not be high enough for sufficient hydraulic reaction or for the mechanical centering of the steering control valve piston in order to be sure of adequate stabilization of that valve. In fact, the reaction chambers can act as damping chambers with no increase of the static actuating forces of the springs which act on the valve by having certain dimensions of the restrictor orifices. However, such damping opposes rapid shifting of the valve and thus leads to undesired delays in steering control, as a result of which the driver may be unable to correct swerving from the roadway quickly enough due to rapid steering inability.

BRIEF DESCRIPTION OF THE PRESENT INVENTION

The purpose of the invention is to improve known servosteering pressure control systems so that the steering control valve operates in a stable manner under critical, i.e., low pressure operating conditions, even with little hydraulic reaction and small static actuating forces.

The rapid return of the steering control valve piston to its neutral position from a steering position is obtained by connecting the two restrictor orifices of the reaction chambers to a hydraulically flexible element and by bypassing the restrictor orifice of a respective reaction chamber, which may be provided, if desired, with a pair of flow control gaps or edges effecting flow rapidly from the respective reaction chamber which bypasses the respective restrictor orifice.

If flow into the reaction chambers is controlled by a pair of variable flow control gaps in accordance with one embodiment, pressure agent can flow out of the reaction chamber, which receives servomotor pressure when the valve piston is shifted from the neutral position, so that a rapid displacement of the valve piston is possible. A reaction force acting against shifting of the valve piston is not effective until pressure has actually built up in the servomotor.

The repositioning of the valve piston in its average neutral position is accomplished by constructing the pairs of flow control gaps for the inlet and outlet of the reaction chamber with zero overlap.

In another embodiment of the invention, the pairs of inlet flow control gaps can be replaced by check valves. In fact, the displacement of the valve piston is somewhat delayed by so doing. However, the steering control valve can be suitably shortened by the elimination of the inlet flow control gaps. Furthermore, a repositioning movement of the valve piston extending beyond the neutral position, which could be brought about by coupling the valve piston with the piston of the servomotor mechanically, is dampened hydraulically.

An accumulator element of a certain size can be installed in the connecting conduit between the two reaction chambers to establish the time constants of the dynamic control of the reaction chambers, viz., the size of the flexible element and the pressure from the reaction chambers, i.e., the dynamic actuating force necessary to move a pressure agent such as oil through the reaction chamber orifices.

If the connecting conduit between the two restrictor orifices is connected with the pressure agent storage tank through another restrictor orifice, an additional static reaction is effected. If the additional restrictor orifice is provided with a variable cross section, the hydraulic reaction can -- depending upon what operational behavior is desired -- have the value of zero or a specific maximum value.

In accordance with a further embodiment of the invention, the two restrictor orifices located in the connecting conduit between the two reaction chambers are replaced by notches in the valve piston. Valve control in shifting the valve piston may be varied by suitably shaping the notches. Furthermore, an advantage of such notches is that they can be readily cleaned if clogged.

A detailed description of the invention now follows in conjunction with the appended drawings, in which:

FIG. 1 shows a schematic representation of a servosteering pressure control device of the invention in a first embodiment with pairs of variable control gaps for the intake;

FIG. 2 shows the servosteering control device of FIG. 1, in a second embodiment using check valves;

Figure 3:
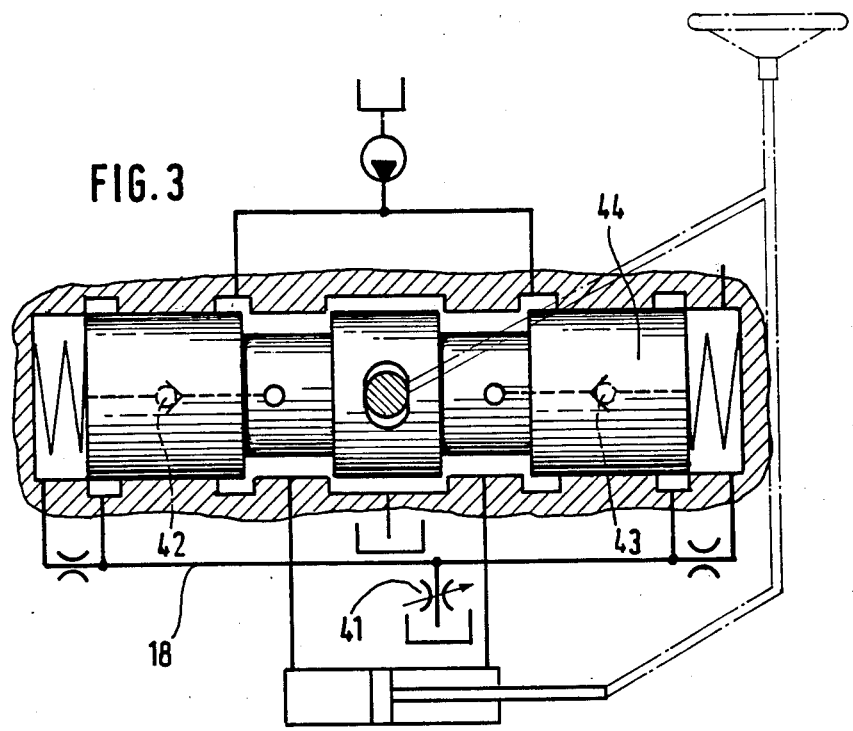
Figure 4:
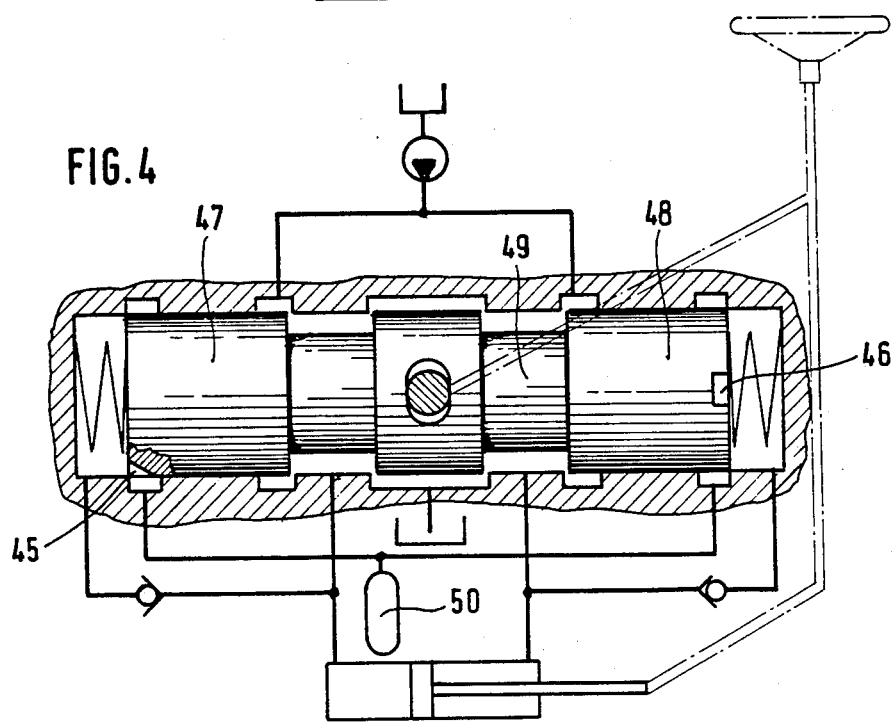

FIG. 3 shows a third and preferred embodiment of the servosteering control device based on FIG. 2, but with an additional restrictor orifice; and FIG. 4 shows a fourth embodiment of the servosteering control device based on FIG. 2 with modified restrictor orifices The servosteering control device of the present invention consists essentially of a control valve 1 located in a steering mechanism, not shown, with a pressure agent of any suitable type being conveyed by a servopump 3 to a servomotor 2 and being returned from there to a storage tank 4.

The control valve 1 contains a valve piston 6 in a valve housing 5 that is capable of being displaced by the application of manual force to a steering wheel and is coupled mechanically with a servopiston 7 of the servomotor 2.

The pressure agent is conveyed to the steering control valve 1 by the servopump 3 in two annular grooves 8 and 9 in housing 5. Two piston grooves 10 and 11 in the valve piston 6 are connected with the two working chambers of the servomotor 2 through two conduits 12 and 13. A central annular groove 14 in housing 5 is connected with the tank 4 through a return conduit 15.

Reaction chambers 16 and 17 are located at the ends of the valve piston 6. The reaction chambers 16 and 17 are connected with each other through a connecting conduit 18. Fixed restrictor orifices 19 and 20 are located in the connecting conduit 18 adjacent the reaction chambers 16 and 17.

Valve piston grooves 10 and 11 and annular grooves 8, 9 and 14 in housing 5 are demarcated to four flow control gaps 21, 22, 23 and 24. These are located for flow control of pressure agent to and from the two working chambers of the servomotor 2. Thus, the first two gaps control pump flow to the servomotor while the second two gaps control return flow to the tank 4.

Grooves 25 and 26 in the valve piston 6 are located axially outwardly of respective piston grooves 10 and 11. Respective annular housing grooves 27 and 28 are disposed inwardly of valve piston 6 for flow control of grooves 25 and 26 and respective annular housing grooves 29 and 30 are located axially outwardly of the annular grooves 8 and 9 in valve housing 5. The valve piston grooves 25 and 26 and the respective annular grooves 27 and 28 in the housing 5 form flow control gaps 31 and 32. Annular grooves 29 and 30 in the housing 5 are located axially adjacent to respective reaction chambers 16 and 17. Axially outer end edges 33 and 34 of the valve piston 6, acting in conjunction with the edges of the annular grooves 29 and 30 in housing 5, form flow control gaps 35 and 36 for outlet flow from respective reaction chambers. The valve piston 6 is kept in central neutral position by two springs 37 and 38 at its ends, the reaction chambers 16 and 17 being pressureless. In the neutral position, the inlet flow control gaps 31 and 32 and the outlet flow control gaps 35 and 36 have zero overlap at the gap edges. Thus, edges of the grooves of valve piston 6 and the grooves of valve housing 5 which form respective flow control gaps are exactly opposite each other. However, even a positive or a negative overlapping for the pairs of edges which form inlet flow control gaps 31 and 32 and the pairs of edges which form outlet flow control gaps 35 and 36 can also be adjusted to predetermine a characteristic curve for operation of the reaction chambers 16 and 17.

In the embodiment shown in FIG. 2, the inlet flow control gaps 31 and 32 for the intake are replaced by two check valves 39 and 40. The check valves 39 and 40 are located between the conduits 12 and 13, on the one side, and the reaction chambers 16 and 17, respectively, on the other, and pressure agent can only flow through the valves in the direction of the reaction chamber that is involved. When the two check valves 39 and 40 are used, the flow control gaps 31 and 32 for the intake and also the piston grooves 25 and 26 and the annular grooves 27 and 28 in housing 5 that correspond with them, are eliminated. Other than these modifications, the construction of the embodiment of FIG. 2 corresponds to the embodiment shown in FIG. 1.

The pairs 31 and 32 of control gaps for the intake as well as the check valves 39 and 40 form an apparatus for acting upon one of the working chambers 16 and 17 with the working pressure of the working chamber of the servomotor 2 that has the higher pressure, depending upon the direction of steering.

In the embodiment in FIG. 3, an additional restrictor orifice 41, which is speed responsive as in the Lang U.S. Pat. No. 4,438,827 hereinabove mentioned, is located between the connecting conduit 18 and the tank 4, the restrictor orifice 41 being represented as a restrictor orifice with a variable cross section. As an alternative to the check valves 39 and 40 located outside of the control valve in FIG. 2, two check valves 42 and 43 are located in the valve piston portions 44 in a suitable manner as shown in FIG. 3. The mode of operation of the check valves 42 and 43 is the same as that of the check valves 39 and 40 in FIG. 2.

In the embodiment shown in FIG. 4, the restrictor orifices 19 and 20 located in the connecting conduit 18 are replaced by indentations 45 and 46 in the end portions 47 and 48 of the valve piston 49. In an axial section through the valve piston 49, for example, the indentations 45 and 46 may have a triangular cross section. However, the indentations can also have another suitable shape, so that the effective cross section of the indentations 45 and 46 is variable in a certain way, depending upon the position of the valve piston 49. The controlling action through the valve passage can be additionally influenced in this manner.

The functioning of the servosteering pressure control device is set forth in the following description:

OPERATION

If the valve piston 6 is moved to the left in the embodiment shown in FIG. 1, the left-hand chamber of the servomotor 2 is pressurized via the closure of the pressure flow control gaps 22, 23 while the exhaust flow control gaps 21, 24 effect return from the right-hand chamber of the servomotor to the tank 4 in a conventional manner. The reaction chamber 16 is simultaneously pressurized upon the opening of inlet flow control gap 31 and the closing of outlet flow control gap 35. The reaction chamber 17 is initially pressureless due to the further closing of the inlet flow control gap 32. Accordingly, steering resistance pressure in the pressurized reaction chamber 16 acts against a leftward movement of the valve piston 6 and, dependent upon the degree of pressure in the servomotor 2, forces it to the right toward the neutral position. To prevent return movement of the valve piston 6 from being impeded by pressure agent contained in the reaction chamber 17 as the valve piston moves toward the right, the pressure agent can flow directly into the connecting conduit 18 through the outlet control gap 36 and conduit, thus bypassing the flow delaying effect of restrictor orifice 20. Such pressure agent flow is stored in the connecting conduit 18 which acts as a storage reservoir.

Thus, the time constants of the dynamic reaction are determined by the cross section of the two restrictor orifices 19 and 20 and the size of the reservoir formed by the connecting conduit 18. Ordinarily, the capacity of the connecting conduit 18 as a storage reservoir suffices. However, in special cases, the installation of an additional reservoir 50, as is represented in FIG. 4, for example, may be necessary. The immediate building up of a counterpressure in the reaction chamber 17 would make a rapid return of the valve piston 6 impossible during a return movement of the valve piston 6 to the right because of the restrictor orifice 20. However, the outlet flow gap 30 precludes delay by remaining open until valve piston 6 returns to the neutral position.

If a road jolt against the vehicle wheels while being steered to the left occurs, the jolt force on the servopiston 7 moves it to the left. Such force acts on the piston rod of the servopiston 7 of servomotor 2 and the valve piston 6 is thus also moved to the left because of the mechanical coupling between them. Such movement takes place very quickly since the pressure agent contained in the reaction chamber 16 flows to the servomotor conduit 12 through the inlet flow control gap 31 until an equalizing pressure has built up. Return of the valve piston 6 to the neutral position takes place quickly under this operating condition since the outlet flow control gap 36 and the pressure agent in reaction chamber 17 which is decreasing in volume can flow to storage connecting line 18, including a storage tank 50, thus bypassing the restrictor orifice 20.

In the embodiments of FIGS. 2 and 3 restrictor orifices and outlet flow gaps as in FIG. 1 are shown.

In the embodiment shown in FIG. 2, a movement of the valve piston to the left caused by a jolt is somewhat dampened by the check valve 39 in connection with restrictor orifice 19, and its return takes place in the same manner.

Thus, an excessive build-up of pressure by dynamic processes in the servomotor is prevented by providing the control gaps 35 and 36 for the outlet because the rapid return of the valve piston 6 to its neutral position results in a rapid reduction of the pressure. Since the return of the valve is of a dynamic nature, the static holding forces that are necessary to move the valve piston out of its neutral position, are not influenced by it.

The hydraulic reaction between the value of zero and the maximum value determined by the cross section of the valve piston can be varied by the variable restrictor orifice 41 represented in FIG. 3. Theoretically, a certain restrictor orifice between the connecting conduit 18 and the tank 4 would always be necessary to make sure of a reduction of pressure from the reaction chambers 16 and 17. However, it has become evident in practice that the inner losses of the control valve 1 from leakage suffice for this reduction of pressure. Consequently, functioning is assured even when the restrictor orifice 41 is completely closed and when no connection exists between the connecting conduit 18 and the tank 4, as is shown in FIGS. 1 and 2.

The functioning of the embodiment shown in FIGS. 2, 3 and 4 corresponds essentially to the functioning of the embodiment shown in FIG. 1.

Use of the invention is preferred with auxiliary power steering mechanisms with variable hydraulic reaction power dependent upon the speed of a motor vehicle. The control valves of these steering mechanisms could, because of the small parking forces that are desired, only have a very weak spring centering that would not suffice, by itself, to ensure stable centering of operation of the control valve without excessive vibration under all driving conditions.

I claim:

1. A servosteering control valve (1) comprising a housing (5) and valve piston (6) therein; flow control means (21, 22, 23, 24) coacting between said valve piston and said housing and upon being relatively shifted effects steering pressure flow from a servopump (3) and return flow to a tank (4), for a steering servomotor (2); said valve piston including opposed reaction chambers (16, 17) connected to be pressurized with respective servomotor pressure chambers responsive to respective steering directions; restrictor orifices (19, 20,; 45, 46) communicating with respective reaction chambers; inlet flow control means (31, 32) (39, 40) (42, 43) for pressurizing respective reaction chambers responsive to shifting of said valve piston by manual effort in steering a vehicle, wherein a steering mechanism is mechanically coupled to said valve piston and said servomotor; the improvement comprising storage means (18, 50) for receiving pressure agent from either reaction chamber and being interconnected therebetween through said restrictor orifices; outlet flow control means (35, 36) for respective reaction chambers connecting between said storage means and respective reaction chambers; wherein shifting of said valve piston in a direction opposite to a direction being steered responsive to pressure in a pressurized reaction chamber actuates the respective outlet flow control means permitting flow from a pressurized reaction chamber to said storage means thereby bypassing the respective restrictor orifice and effecting rapid response of said valve piston toward neutral position.

2. A servosteering control valve as set forth in claim 1, wherein said outlet flow control means (35, 36) comprise the outer edges of respective end lands of said valve piston coacting with an edge of respective grooves (28, 29) of the housing; said coacting edges forming a flow gap which opens when said valve piston is shifted by pressure in a respective reaction chamber to release pressure agent from said pressure chamber to said storage means for thus bypassing respective restrictor orifices to effect rapid flow from respective pressure chambers.

3. A servosteering control valve as set forth in claim 1, said coacting edges having zero overlap in the neutral position of said valve piston.

4. A servosteering control valve as set forth in claim 1, said inlet flow control means comprising the edges of lands of said valve piston and edges of grooves (27, 28) in said housing coacting to form inlet flow control gaps (31, 32) for respective reaction chambers and opening in a direction responsive to shifting of said valve piston in a selected direction to communicate a servomotor chamber pressure to a respective reaction chamber.

5. A servosteering control valve as set forth in claim 4, said coacting edges having zero overlap.

6. A servosteering control valve as set forth in claim 1, wherein said inlet flow control means comprise respective check valves (39, 40, 42, 43) connecting between pressure chambers of said servomotor and respective reaction chambers and opening by servomotor pressure in a direction to effect flow from said servomotor pressure chambers to respective reaction chambers.

7. A servosteering control valve as set forth in claim 1, wherein said storage means comprises an interconnecting conduit (18) between said restrictor orifices.

8. A servosteering control valve as set forth in claim 1, said storage means comprising a tank (50).

9. A servosteering control valve as set forth in claim 1, wherein the storage means connects through a variable restrictor orifice (41) to a tank which provides pressure agent to a pump (3).

10. A servosteering control valve as set forth in claim 9, said variable restrictor orifice having a variable flow cross section.

11. A servosteering control valve as set forth in claim 1, said valve piston comprising lands closing respective reaction chambers, said restrictor orifices being notches (45, 46) in the outer ends of said lands effecting outlet channels; respective grooves in the housing coacting with said notches to communicate pressure flow from respective reaction chambers to said storage means responsive to shifting of said valve piston in a respective direction.

12. A servosteering control valve as set forth in claim 11, wherein said notches have a predetermined flow area cross section to effect a predetermined flow dependent on a shifted position of said valve piston.

* * * * *